(12) United States Patent
Taur et al.

(10) Patent No.: US 6,864,835 B1
(45) Date of Patent: Mar. 8, 2005

(54) APPARATUS AND METHOD OF USING SATELLITE RANGING CHANNELS FOR TRANSMITTING 3-D VIDEO SIGNALS FOR SPACE APPLICATIONS

(75) Inventors: Roger R. Taur, San Jose, CA (US); Ted Mitsuteru Sugiki, Kanagawa (JP); Hiroyuki Okamoto, Kanagawa (JP)

(73) Assignee: Astro Research Corporation, Yokohama (JP)

( * ) Notice: Subject to any disclaimer, the term of this patent is extended or adjusted under 35 U.S.C. 154(b) by 0 days.

(21) Appl. No.: 10/835,921

(22) Filed: Apr. 29, 2004

(51) Int. Cl.[7] .............................................. H04B 7/185
(52) U.S. Cl. .................................. 342/357.01; 455/12.1
(58) Field of Search ....................... 342/357.01, 357.09, 342/357.12, 352; 455/12.1, 13.1; 370/207, 260

(56) References Cited

U.S. PATENT DOCUMENTS 5,416,801 A * 5/1995 Chouly et al. ............... 375/260
6,669,148 B2 12/2003 Anderman et al.

* cited by examiner

*Primary Examiner*—Dao Phan
(74) *Attorney, Agent, or Firm*—Boris G. Tankhilevich

(57) ABSTRACT

Apparatus and method of using satellite ranging channels for transmitting 3-d video signals for space applications. The method comprises the following steps:(A) performing a standard ranging operation to estimate a distance between an active satellite and a passive/target satellite; (B) transmitting to a (TTC) a set of ranging data for estimating the distance between the active satellite and the passive/target satellite by using at least one standard ranging channel; (C) disabling standard ranging operation in order to free each standard satellite ranging channel for a video-ranging operation if the estimated distance between the active satellite and the passive/target satellite is less than a predetermined distance; (D) performing the video-ranging operation to estimate the distance between the active satellite and the passive/target satellite if the estimated distance between the active satellite and the passive/target satellite is less than the predetermined distance; (E) transmitting the plurality of images of the passive/target satellite obtained by the active satellite to the TTC) by using at least two standard satellite ranging channels; and (F) using the plurality of images of the passive/target satellite in order to perform a set of operations selected from the group consisting of: {capturing the passive/target satellite by the active satellite; detecting an outside damage in the passive/target satellite; and approaching the passive/target satellite by the active satellite in order to perform a set of repair services}.

27 Claims, 1 Drawing Sheet

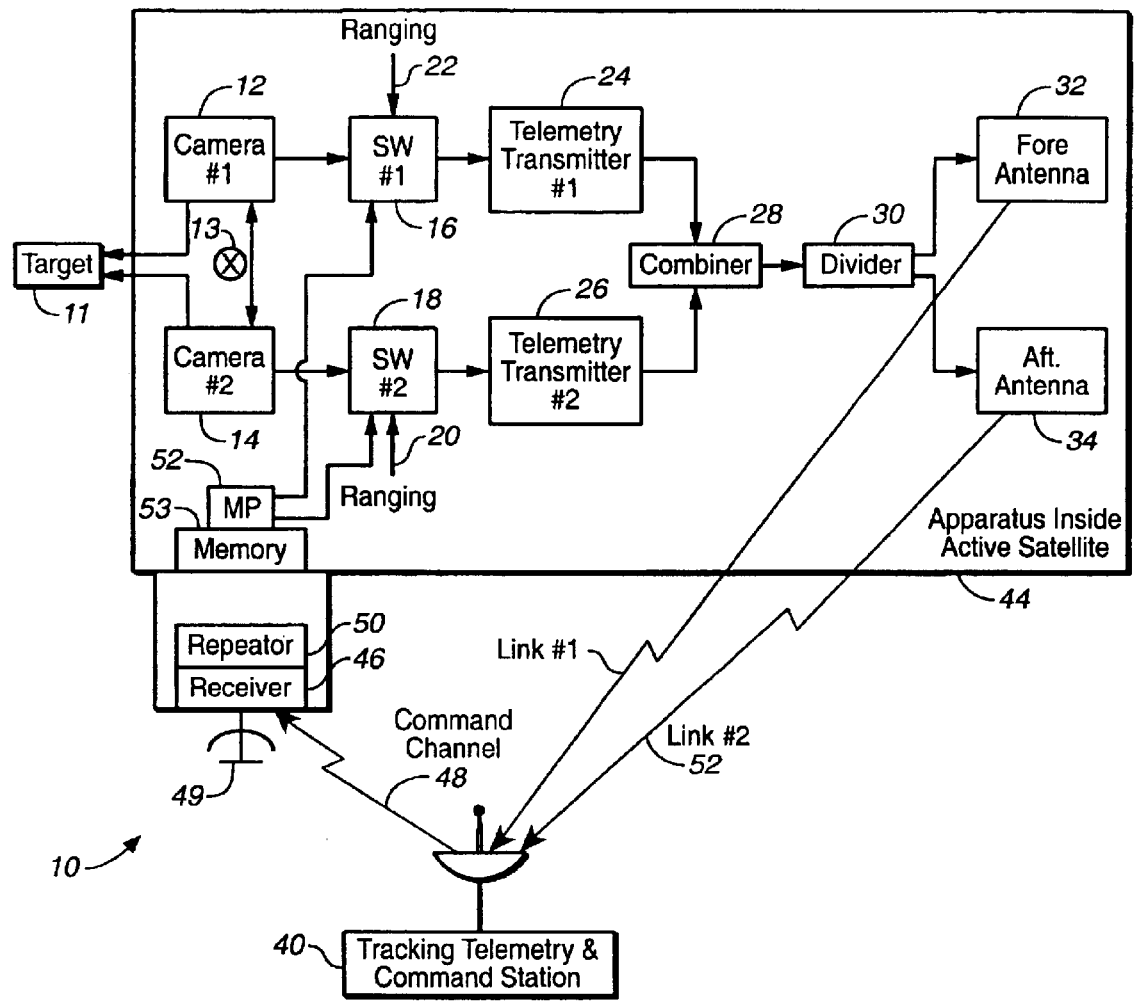
FIG._1
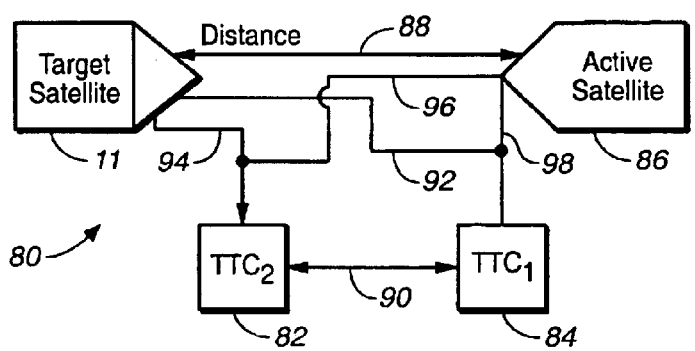
FIG._2

APPARATUS AND METHOD OF USING SATELLITE RANGING CHANNELS FOR TRANSMITTING 3-D VIDEO SIGNALS FOR SPACE APPLICATIONS

BACKGROUND OF THE INVENTION

1. Field of the Invention

The present invention is in the field of space applications. More specifically, the present invention relates to a method of transmitting 3-D video signals using satellite ranging channels for space applications.

2. Discussion of the Prior Art

Many space missions require three dimensional real time video transmissions. In the prior art, typically an elaborate camera system employing dedicated transponders and spacecraft antennas is linked through a relay satellite to a Tracking, Telemetry, and Control Station (TTC) in order to transmit the full color images related to a particular space mission. To implement this kind of three dimensional real time video transmission including full color images, a large amount of data should be transmitted at fairly high rate, typically at 12 Mbps even with data compression. The data compression process adds delay and the transmitted real time video images become pseudo-real time video images.

In addition, the transponder requires large amount of power to operate and a high spacecraft antenna pointing accuracy is necessary to implement this kind of three dimensional video transmission including full color images. However, the high spacecraft antenna pointing accuracy is very difficult to implement when the cameras are operating while the spacecraft is maneuvering.

What is needed is to significantly simplify the transmission of three dimensional real time video images from space to a (TTC) so that the transmission of images of space objects has a real time capability in certain cases and a high pointing accuracy of spacecraft antennas is not required.

SUMMARY OF THE INVENTION

To address the shortcomings of the available art, the present invention provides an efficient, low power and light weight video system that does not require high pointing accuracy of spacecraft antennas and has a real time capability for transmission of black & white video images of space objects.

One aspect of the present invention is directed to a method of transmitting a plurality of images of a passive/target satellite to a (TTC) by using at least two standard satellite ranging channels.

In one embodiment of the present invention, the method comprises the following steps: (A) performing a standard ranging operation to estimate a distance between the active satellite and the passive/target satellite; (B) transmitting to the (TTC) a set of ranging data for estimating the distance between the active satellite and the passive/target satellite by using at least one standard ranging channel; (C) disabling the standard ranging operation in order to free each standard satellite ranging channel for a video-ranging operation if the estimated distance between the active satellite and the passive/target satellite is less than a predetermined distance; and (D) performing the video-ranging operation to estimate the distance between the active satellite and the passive/target satellite if the estimated distance between the active satellite and the passive/target satellite is less than the predetermined distance.

In one embodiment, the method of the present invention claim further comprises the steps of: (E) transmitting the plurality of images of the passive/target satellite obtained by the active satellite to the (TTC) by using the at least two standard satellite ranging channels; and (F) using the plurality of images of the passive/target satellite in order to perform a set of operations selected from the group consisting of: {capturing the passive/target satellite by the active satellite; detecting an outside damage in the passive/target satellite; and approaching the passive/target satellite by the active satellite in order to perform a set of repair services}.

In one embodiment of the present invention, the step (A) of performing the standard ranging operation to estimate the distance between the active satellite and the passive/target satellite further includes the step (A1) of using a triangulation method by at least two Tracking, Telemetry, and Control Stations to estimate the distance between the active satellite and the passive/target satellite.

In one embodiment of the present invention, the step (B) of transmitting to the (TTC) the set of ranging data including the estimated distance between the active satellite and the passive/target satellite by using at least one ranging channel further comprises the step (B1) of directly phase-modulating a telemetry signal by a ranging signal.

In one embodiment of the present invention, the step (B) of transmitting to the (TTC) the set of ranging data including the estimated distance between the active satellite and the passive/target satellite by using at least one ranging channel further comprises the step (B2) of using at least one telemetry transmitter to transmit a set of telemetry data to the (TTC). The ranging signal includes the set of ranging data.

In one embodiment of the present invention, the step (B) of transmitting to the (TTC) the set of ranging data including the estimated distance between the active satellite and the passive/target satellite by using at least one ranging channel further comprises the step (B3) of using at least two telemetry transmitters configured to transmit the set of telemetry data, wherein the first telemetry transmitter operates at a first sub-carrier frequency, and wherein the second telemetry transmitter operates at a second sub-carrier frequency.

In one embodiment of the present invention, the step (C) of disabling the standard ranging operation in order to free each standard ranging channel for the video-ranging operation if the estimated distance between the active satellite and the passive/target satellite is less than the predetermined distance further includes the following steps: the step (C1) of receiving a command signal from the TTC in a command channel indicating that a distance between the active satellite and the passive/target satellite is less than the predetermined distance; and the step (C2) of using at least two switches, wherein each switch is configured to switch one telemetry channel to the video-ranging operation.

In one embodiment of the present invention, the step (D) of performing the video-ranging operation further comprises the step (D1) of generating a plurality of images of the passive/target satellite by an active satellite equipped with at least two digital video cameras.

In one embodiment of the present invention, the step (D1) of generating the plurality of images of the passive/target satellite by the active satellite equipped with at least two digital video cameras further includes the step (D1, 1) of substantially continuously generating a plurality of 3-D digital video signals by using the at least two digital video cameras, each 3-D digital video signal representing a 3-D image of the passive/target satellite.

More specifically, in one embodiment of the present invention, the step (D1) of generating the plurality of images of the passive/target satellite by the active satellite equipped with at least two digital video cameras further includes the step (D1, 2) of substantially continuously generating a plurality of black & white 3-D digital video signals by using at least two digital black & white video cameras, each black & white 3-D digital video signal representing a 3-D image of the passive/target satellite. In another embodiment of the present invention, the step (D1) of generating the plurality of images of the passive/target satellite by the active satellite equipped with at least two digital video cameras further includes the step (D1, 3) of substantially continuously generating a plurality of compressed colored 3-D digital video signals by using at least two digital colored video cameras, each compressed colored 3-D digital video signal representing a 3-D image of the passive/target satellite.

In one embodiment of the present invention, the step (E) of transmitting the plurality of images of the passive/target satellite obtained by the active satellite to the (TTC) by using at least two standard ranging channels further includes the step (E1) of using at least two spacecraft antennas, a Fore (Forward) spacecraft antenna, and an Aft (Back) spacecraft antenna to transmit to the TTC the plurality of images of the passive/target satellite by using at least two standard ranging channels.

In one embodiment of the present invention, the step (E1) of using at least two spacecraft antennas, the Fore (Forward) spacecraft antenna, and the Aft (Back) spacecraft antenna to transmit to the TTC the plurality of images of the passive/target satellite further includes the step (E1, 1) of combining and dividing signals generated by the first and second telemetry transmitters in proper proportions in order to optimize the transmission of the images of the passive/target satellite without pointing each spacecraft antenna.

Another aspect of the present invention is directed to an apparatus for transmitting a plurality of images of a passive/target satellite to a (TTC) by using at least two standard satellite ranging channels.

In one embodiment, the apparatus of the present invention comprises: (A) a means for performing a standard ranging operation to estimate a distance between the active satellite and the passive/target satellite; (B) a means for transmitting to the (TTC) a set of ranging data for estimating the distance between the active satellite and the passive/target satellite; (C) a means for disabling the standard ranging operation in order to free each standard satellite ranging channel for a video-ranging operation if the estimated distance between the active satellite and the passive/target satellite is less than a predetermined distance; and (D) a means for performing the video-ranging operation to estimate the distance between the active satellite and the passive/target satellite if the estimated distance between the active satellite and the passive/target satellite is less than the predetermined distance.

In one embodiment, the apparatus of the present invention further comprises: (E) a means for transmitting the plurality of images of the passive/target satellite obtained by the active satellite to the (TTC) by using at least two standard satellite ranging channels; and (F) a means for performing a set of operations by using the plurality of images of the passive/target satellite. The set of operations is selected from the group consisting of: {capturing the passive/target satellite by the active satellite; detecting an outside damage in the passive/target satellite; and approaching the passive/target satellite by the active satellite in order to perform a set of repair services}.

In one embodiment of the present invention, the means (A) for performing the standard ranging operation to esti-mate the distance between the active satellite and the passive/target satellite further includes: (A1) a triangulation method means configured to use at least two Tracking, Telemetry, and Control Stations to estimate the distance between the active satellite and the passive/target satellite.

In one embodiment of the present invention, the means (B) for transmitting to the (TTC) the set of ranging data including the estimated distance between the active satellite and the passive/target satellite further comprises: (B1) a means for transmitting to the (TTC) a set of ranging data for estimating the distance between the active satellite and the passive/target satellite by using at least one standard ranging channel.

In one embodiment of the present invention, the means (B) for transmitting to the (TTC) the set of ranging data including the estimated distance between the active satellite and the passive/target satellite further comprises: (B2) a means for directly phase-modulating a telemetry signal by a ranging signal, the ranging signal including the set of ranging data.

In one embodiment of the present invention, the means (B) for transmitting to the (TTC) the set of ranging data including the estimated distance between the active satellite and the passive/target satellite further comprises: (B3) at least one telemetry transmitter configured to transmit a set of telemetry data to the (TTC).

In one embodiment of the present invention, the means (B) for transmitting to the (TTC) the set of ranging data including the estimated distance between the active satellite and the passive/target satellite further comprises: (B4) at least two telemetry transmitters configured to transmit the set of telemetry data to the (TTC), wherein the first telemetry transmitter operates at a first sub-carrier frequency, and wherein the second telemetry transmitter operates at a second sub-carrier frequency.

In one embodiment of the present invention, the means (C) for disabling the standard ranging operation in order to free each standard ranging channel for the video-ranging operation if the estimated distance between the active satellite and the passive/target satellite is less than the predetermined distance further includes: (C1) a receiver configured to receive a command signal from the TTC in a command channel, wherein the command signal is configured to indicate that a distance between the active satellite and the passive/target satellite is less than the predetermined distance; and (C2) at least two switches, each switch configured to switch one telemetry channel to the video-ranging operation.

In one embodiment of the present invention, the means (D) for performing the video-ranging operation further comprises: (D1) a means for generating a plurality of images of the passive/target satellite.

More specifically, in one embodiment of the present invention, the means (D) for performing the video-ranging operation further comprises: (D2) the active satellite equipped with at least two digital video cameras; wherein each digital video camera is configured to substantially continuously generate a plurality of compressed colored 3-D digital video signals, and wherein each compressed colored 3-D digital video signal represents a compressed colored 3-D image of the passive/target satellite. In another embodiment of the present invention, the means (D) for performing the video-ranging operation further comprises: (D3) the active satellite equipped with at least two digital black & white video cameras; wherein each digital black &white video camera is configured to substantially continuously generate a plurality of black & white 3-D digital video signals, each black & white 3-D digital video signal representing a 3-D image of the passive/target satellite.

In one embodiment of the present invention, the means (E) for transmitting the plurality of images of the passive/target satellite obtained by the active satellite to the (TTC) by using the at least two standard ranging channels further includes: (E1) at least two spacecraft antennas, a Fore (Forward) spacecraft antenna, and a Aft (Back) spacecraft antenna, configured to transmit to the TTC the plurality of images of the passive/target satellite using at least two standard ranging channels; and (E2) a combiner and a divider configured to combine and to divide in proper proportions signals generated by first and second telemetry transmitters in order to optimize the transmission of images of the passive/target satellite without pointing each spacecraft antenna.

BRIEF DESCRIPTION OF DRAWINGS

The aforementioned advantages of the present invention as well as additional advantages thereof will be more clearly understood hereinafter as a result of a detailed description of a preferred embodiment of the invention when taken in conjunction with the following drawings.

FIG. 1 depicts the 3-D video system block diagram of the apparatus of the present invention for space applications placed inside an active satellite.

FIG. 2 illustrates a triangulation method using at least two Tracking, Telemetry, and Control Stations, TTC 1 and TTC 2 to estimate the distance between the active satellite including the apparatus of the present invention of FIG. 1, and the passive/target satellite.

DETAILED DESCRIPTION OF THE PREFERRED AND ALTERNATIVE EMBODIMENTS.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

In one embodiment, FIG. 1 depicts the 3-D video system block diagram 44 of the apparatus of the present invention for space applications that is located inside an active satellite. The apparatus 44 is configured to transmit a plurality of video images of a passive/target satellite 11 to a (TTC) 40 by using at least two standard satellite ranging channels. The transition from a standard ranging operation to a video-ranging operation is operated by a switch #1 16 in the first ranging channel, and by a switch #2 18 in the second ranging channel under the control of the microprocessor 52 when its receives the command signal from TTC 40. Please, see the complete discussion below.

Initially, we will focus our discussion on standard ranging channels that are used by the apparatus of the present invention 44 (of FIG. 1) to transmit video images of the target satellite 11. For system reliability, each spacecraft is typically equipped with two telemetry transmitters at two different frequencies.

Referring still to FIG. 1, in one embodiment of the present invention, each ranging channel includes at least one telemetry transmitter 24 (or 26) configured to transmit a set of telemetry data to the (TTC) 40. In one embodiment of the present invention, the first telemetry transmitter 24 (normal telemetry transmitter) operates at a first (normal) sub-carrier frequency, and the second telemetry transmitter 26 (dwell telemetry transmitter) operates at a second (dwell) sub-carrier frequency. Typically, a sub-carrier at a few kilohertz (e. g. 40.96 kHz) phase or frequency modulates the telemetry carrier that is used by a telemetry link. The data rate ranges from a few tens of bits/second to a few kilobits/second. The modulated outputs of the telemetry transmitters 24 and 26 are combined by the combiner 28 and divided by the divider 30 in proper proportions. Since both spacecraft antennas are near hemispherical coverage, accurate spacecraft antenna pointing is not required.

In one embodiment, each standard satellite ranging channel employs at least one TTC link. TTC links 50 and 52 are operated within the Space Operation Service (SOS) frequency bands. The frequencies normally used are in S-band as follows: the uplink in the band 2025 to 2120 MHz; the downlink in the band 2200 to 2300 MHz.

Referring still to FIG. 1, in general terms, the apparatus of the present invention comprises a means for performing a standard ranging operation to estimate a distance between the active satellite and the passive/target satellite 11.

In one embodiment of the present invention, as depicted in FIG. 2, at least two Tracking, Telemetry, and Control Stations, TTC1 84, and TTC2 82, can be used in a triangulation method to estimate the distance 88 between the active satellite 86 including the apparatus of the present invention (44 of FIG. 1), and the passive/target satellite 11.

The basic method of measuring distances in astronomy uses the geometry (or trigonometry) of triangles, and is called triangulation. One needs to measure a distance that serves as the base of the triangle, which is the distance 90 between two Tracking, Telemetry, and Control Stations, TTC 1 84 and TTC 2 82. The tip of the first triangle is located at the target satellite 11 whose distance 94 from the TTC 2 and 92 from TTC 1 we should find first. One can measure the angles defined by the base 90 and sides 92 and 94 connecting the base to the tip of the triangle-target 11. By a fundamental theorem of geometry, knowing these quantities is sufficient to determine everything else about the first triangle. Similarly, we can determine the distance 96 from the Tracking, Telemetry, and Control Station 82 TTC 2 to the active satellite 86, and the distance 98 from Tracking, Telemetry, and Control Station 84 TTC 1 and the active satellite 86. Finally, we can determine the distance D 88 between the target 11 and the active satellite 86 after all distances 94, 96, 98, and 96 have been determined.

When the distance D (88 of FIG. 2) between the active satellite 86 and the passive target satellite 11 becomes less than the predetermined distance, the apparatus of the present invention should disable the standard ranging operation in order to free each standard satellite ranging channel for a video-ranging operation. Typically, the predetermined distance D should be about 200 meters.

Referring still to FIG. 1, in one embodiment of the present invention, the apparatus includes a receiver 46 configured to receive a command signal from the TTC in a command channel 48 that can be used to indicate that the distance D between the active satellite and the passive/target satellite is less than the predetermined distance. The command channels are provided by a carrier whose frequency depends on the band used and is phase or frequency modulated by a subcarrier at a few kilohertz (e.g. : at 8 kHz). The digital phase modulation of this subcarrier by the data has been realized. The bit stream has a data rate ranging from some hundreds of bit/second to several kilobit/second according to the application. If the low bit rate is used, the use of a subcarrier enables the useful spectrum including the data to be separated from the carrier itself.

The receiver 46 configured to receive a command from the TTC 40 is a part of the active satellite payload. The receiver 46 includes an antenna 49 and a repeater 50. The command transmitted from TTC to the apparatus 44 of the present invention to switch from the standard ranging operation to the video-ranging operation can be executed immediately after reception by the microprocessor 50 that activates the switches 16 and 18, or can be stored in the memory unit 53 for further usage. Each switch is configured to switch one telemetry channel from the standard ranging operation to the video-ranging operation.

Referring still to FIG. 1, in one embodiment, the apparatus 44 of the present invention placed inside the active satellite comprises at least two digital video cameras 12 and 14. Two cameras 12 and 14, separated by a distance X (13) that is determined by the application requirement, are pointed at the target 11. The distance X between two cameras is in the range from 10 cm to 2 meters, determining by magnification factor of each camera. Each camera should have proper compression circuits to eliminate space and temporal redundancies.

The output of first camera 12 is connected directly to the ranging input of first telemetry transmitter 24 through the switch #1 16 in the first ranging channel, as shown in FIG. 1. Similarly, the output of second camera 12 is connected directly to the ranging input of the second telemetry transmitter 26 through the switch #2 18 in the second ranging channel, as shown in FIG. 1. Ranging is performed prior to the camera operation and should remain disabled when the cameras are on. Please, see discussion above.

In one embodiment, each digital video camera, 12 and/or 14, includes a colored 3-D digital video camera configured to substantially continuously generate a plurality of compressed colored 3-D digital video signals. Each compressed colored 3-D digital video signal represents a compressed colored 3-D image of the passive/target satellite II. In this embodiment, PANASONIC PV-GS200 can be used as a colored 3-D digital video camera for the purposes of the present invention. It includes a Leica Dicomar Lens and 3CCD technology, whereas the 2.3 Megapixel PV-GS200 can produce motion and still images of the target 11 (of FIG. 1) with true color and expressive details. In this embodiment, Sony DCR-HC40 Digital Camcorder (Mini DV) can be also used as a colored 3-D digital video camera for the purposes of the present invention. It features a 1.0 Megapixel Advanced HAD™ imaging chip and a Carl Zeiss® Vario-Tessar® lens which can be combined to capture video of the target 11 (of FIG. 1) with all necessary details and clarity. It also includes a huge 2.5" hybrid SwivelScreen™ touch panel LCD display with a 3D menu system, Super NightShot® Plus infrared recording, USB streaming, and digital still image capturing on MemoryStick DUO™ media. In this embodiment, Sony DCR-PC330 MiniDV Digital Camcorder (3.3 MP, 10× Opt, 120× Dig, 2.5" LCD) can be also used as a colored 3-D digital video camera for the purposes of the present invention. Featuring 3.3 MegaPixel still image capture capability along with an Advanced HAD™ CCD imager, a Carl Zeiss® Vario-Sonnar® T* lens and an advanced primary color filter, the DCR-PC330 can create outstanding video and digital photographs of the target 11 (of FIG. 1). In addition to Super NightShot® infrared system for shooting video in total darkness and Super SteadyShot® system for image stabilization, the PC330 has a smooth interval record feature, enabling smooth time-lapse recording. It projects a laser grid across the subject to maximize contrast even with smooth surfaces and assist in accurate focusing in dark conditions. It also uses a NightFraming system with infrared technology to frame and capture a still shot of the target 11 with no or low lighting.

In another embodiment of the present invention, each digital video camera, 12 and/or 14, includes a black & white video camera configured to substantially continuously generate a plurality of black & white 3-D digital video signals. Each black & white 3-D digital video signal represents a 3-D image of the passive/target satellite 11. In this embodiment, Sony DCR-HC30/E compact MiniDV Digital Handycam can be used for the purposes of the present invention. It includes Carl Zeiss lens, NightShot Plus, Easy Handycam operation and Memory Stick Duo slot. It also includes NightShot Plus system that allows for recording in darkness with no residual images even when shooting fast moving objects.

Referring still to FIG. 1, in one embodiment of the present invention, the plurality of images of the passive/target satellite obtained by the active satellite is transmitted to the (TTC) 40 by using the at least two standard satellite ranging channels as was discussed above. These real-time plurality of video images could be used to perform a set of operations selected from the group consisting of: {capturing the passive/target satellite by the active satellite; detecting an outside damage in the passive/target satellite; and approaching the passive/target satellite by the active satellite in order to perform a set of repair services}.

EXAMPLE A

Capturing the Passive/Target Satellite by the Active Satellite

The plausible scenario is as follows: the Boeing 601 series satellites are running out of fuel due to the failure of electric propulsion engine. The capturing satellite could be a specialty satellite.

EXAMPLE B

Detecting an Outside Damage in the Passive/Target Satellite

The real scenario is as follows: One of the Loral satellites, Estrela do Sul, recently failed to deploy the solar panel.

EXAMPLE C

Approaching the Passive/Target Satellite by the Active Satellite in Order to Perform a Set of Repair Services This plausible scenario is as follows: The specialty satellite includes a robotic arm for the repair mission.

One aspect of the present invention is directed to a method of transmitting a plurality of images of a passive/target satellite to a (TTC) by using at least two standard satellite ranging channels. In one embodiment of the present invention, the method comprises the following basic steps (not shown): (A) performing a standard ranging operation to estimate a distance between the active satellite and the passive/target satellite; (B) transmitting to the (TTC) a set of ranging data for estimating the distance between the active satellite and the passive/target satellite by using at least one standard ranging channel; (C) disabling the standard ranging operation in order to free each standard satellite ranging channel for a video-ranging operation if the estimated distance between the active satellite and the passive/target satellite is less than a predetermined distance; D) performing the video-ranging operation to estimate the distance between the active satellite and the passive/target satellite if the estimated distance between the active satellite and the passive/target satellite is less than the predetermined distance; (E) transmitting the plurality of images of the passive/target satellite obtained by the active satellite to the (TTC) by using the at least two standard satellite ranging channels; and (F) using the plurality of images of the passive/target satellite in order to perform a set of operations selected from the group consisting of: {capturing the passive/target satellite by the active satellite; detecting an outside damage in the passive/target satellite; and approaching the passive/target satellite by the active satellite in order to perform a set of repair services}.

The present invention has the following special features: (1) It maximizes the usage of the direct modulating characteristics of the ranging channels; (2) Since telemetry is normally at 9.8 KBPS and is on a sub-carrier, its effect on the video signal is fairly small, similar to that of the spread spectrum operation; (3) There is no special transponder for video transmission; (4) There is no single point failure; (5) Because each camera's output is transmitted simultaneously, time delay is minimized; (6) Pointing is not required for the spacecraft antennas; (7) The present invention can be directly applied on un-manned on-orbital satellite recovery missions; since colored video is not necessary, two black and white cameras with compressed data rate of 100 KBPS can give sufficient resolution for the mission.

The foregoing description of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of transmitting a plurality of images of a passive/target satellite to a Tracking, Telemetry, and Control Station (TTC) by using at least two standard satellite ranging channels, said method comprising the steps of:

(A) performing a standard ranging operation to estimate a distance between an active satellite and said passive/target satellite;

(B) transmitting to said (TTC) a set of ranging data for estimating said distance between said active satellite and said passive/target satellite by using said at least one standard ranging channel;

(C) disabling said standard ranging operation in order to free each said standard satellite ranging channel for a video-ranging operation if said estimated distance between said active satellite and said passive/target satellite is less than a predetermined distance; and (D) performing said video-ranging operation to estimate said distance between said active satellite and said passive/target satellite if said estimated distance between said active satellite and said passive/target satellite is less than said predetermined distance.

2. The method of claim 1 further comprising the step of:

(E) transmitting said plurality of images of said passive/target satellite obtained by said active satellite to said (TTC) by using said at least two standard satellite ranging channels.

3. The method of claim 2 further including the step of:

(F) using said plurality of images of said passive/target satellite in order to perform a set of operations selected from the group consisting of: {capturing said passive/target satellite by said active satellite; detecting an outside damage in said passive/target satellite; and approaching said passive/target satellite by said active satellite in order to perform a set of repair services}.

4. The method of claim 1, wherein said step (A) of performing said standard ranging operation to estimate said distance between said active satellite and said passive/target satellite further includes the step of:

(A1) using a triangulation method by at least two Tracking, Telemetry, and Control Stations to estimate said distance between said active satellite and said passive/target satellite.

5. The method of claim 2, wherein said step (B) of transmitting to said (TTC) said set of ranging data including said estimated distance between said active satellite and said passive/target satellite by using said at least one ranging channel further comprises the step of:

(B1) directly phase-modulating a telemetry signal by a ranging signal, said ranging signal including said set of ranging data.

6. The method of claim 5 further including the step of:

(B2) using at least one telemetry transmitter to transmit a set of telemetry data to said (TTC).

7. The method of claim 5 further including the step of:

(B3) using said at least two telemetry transmitters to transmit said set of telemetry data, wherein said first telemetry transmitter operates at a first sub-carrier frequency, and wherein said second telemetry transmitter operates at a second sub-carrier frequency.

8. The method of claim 1, wherein said step (C) of disabling said standard ranging operation in order to free each said standard ranging channel for said video-ranging operation if said estimated distance between said active satellite and said passive/target satellite is less than said predetermined distance further includes the steps of:

(C1) receiving a command signal from said TTC in a command channel indicating that a distance between said active satellite and said passive/target satellite is less than said predetermined distance; and (C2) using at least two switches, wherein each said switch is configured to switch one said telemetry channel to said video-ranging operation.

9. The method of claim 1, wherein said step (D) of performing said video-ranging operation further comprises the step of:

(D1) generating a plurality of images of said passive/target satellite by an active satellite equipped with at least two digital video cameras.

10. The method of claim 9, wherein said step (D1) of generating said plurality of images of said passive/target satellite by said active satellite equipped with at least two digital video cameras further includes the step of:

(D1, 1) substantially continuously generating a plurality of 3-D digital video signals by using said at least two digital video cameras, each said 3-D digital video signal representing a 3-D image of said passive/target satellite.

11. The method of claim 9, wherein said step (D1) of generating said plurality of images of said passive/target satellite by said active satellite equipped with at least two digital video cameras further includes the step of:

(D1, 2) substantially continuously generating a plurality of black & white 3-D digital video signals by using said at least two digital black & white video cameras, each said black & white 3-D digital video signal representing a 3-D image of said passive/target satellite.

12. The method of claim 9, wherein said step (D1) of generating said plurality of images of said passive/target satellite by said active satellite equipped with at least two digital video cameras further includes the step of:

(D1, 3) substantially continuously generating a plurality of compressed colored 3-D digital video signals by using at least two digital colored video cameras, each said compressed colored 3-D digital video signal representing a 3-D image of said passive/target satellite.

13. The method of claim 7, wherein said step (E) of transmitting said plurality of images of said passive/target satellite obtained by said active satellite to said (TTC) by using said at least two standard ranging channels further includes the step of:

(E1) using at least two spacecraft antennas, a Fore (Forward)spacecraft antenna, and a Aft (Back) spacecraft antenna to transmit to said TTC said plurality of images of said passive/target satellite by utilizing said at least two standard ranging channels.

14. The method of claim 13, wherein step (E1) of using said at least two spacecraft antennas, said Fore (Forward) spacecraft antenna, and said Aft (Back) spacecraft antenna to transmit to said TTC said plurality of images of said passive/target satellite further includes the step of:

(E1, 1) combining and dividing signals generated by said first telemetry transmitter and by said second telemetry transmitter in proper proportions in order to optimize the transmission of said images of said passive/target satellite without pointing each said spacecraft antenna.

15. An apparatus for transmitting a plurality of images of a passive/target satellite to a (TTC) by using at least two standard satellite ranging channels, said apparatus comprising:

(A) a means for performing a standard ranging operation to estimate a distance between an active satellite and said passive/target satellite;

(B) a means for transmitting to said (TTC) a set of ranging data for estimating said distance between said active satellite and said passive/target satellite;

(C) a means for disabling said standard ranging operation in order to free each said standard satellite ranging channel for a video-ranging operation if said estimated distance between said active satellite and said passive/target satellite is less than a predetermined distance; and (D) a means for performing said video-ranging operation to estimate said distance between said active satellite and said passive/target satellite if said estimated distance between said active satellite and said passive/target satellite is less than said predetermined distance.

16. The apparatus of claim 15 further comprising:

(E) a means for transmitting said plurality of images of said passive/target satellite obtained by said active satellite to said (TTC) by using said at least two standard satellite ranging channels.

17. The apparatus of claim 15 further comprising:

(F) a means for performing a set of operations by using said plurality of images of said passive/target satellite; wherein said set of operations is selected from the group consisting of: {capturing said passive/target satellite by said active satellite; detecting an outside damage in said passive/target satellite; and approaching said passive/target satellite by said active satellite in order to perform a set of repair services}.

18. The apparatus of claim 15, wherein said means (A) for performing said standard ranging operation to estimate said distance between said active satellite and said passive/target satellite further includes:

(A1) a triangulation method means configured to use at least two Tracking, Telemetry, and Control Stations to estimate said distance between said active satellite and said passive/target satellite.

19. The apparatus of claim 15, wherein said means (B) for transmitting to said (TTC) said set of ranging data including said estimated distance between said active satellite and said passive/target satellite further comprises:

(B1) a means for transmitting to said (TTC) a set of ranging data for estimating said distance between said active satellite and said passive/target satellite by using said at least one standard ranging channel.

20. The apparatus of claim 15, wherein said means (B) for transmitting to said (TTC) said set of ranging data including said estimated distance between said active satellite and said passive/target satellite further comprises:

(B2) a means for directly phase-modulating a telemetry signal by a ranging signal, said ranging signal including said set of ranging data.

21. The apparatus of claim 20 further comprising:

(B3) at least one telemetry transmitter configured to transmit a set of telemetry data to said (TTC).

22. The apparatus of claim 20 further comprising:

(B4) at least two telemetry transmitters configured to transmit said set of telemetry data to said (TTC), wherein said first telemetry transmitter operates at a first sub-carrier frequency, and wherein said second telemetry transmitter operates at a second sub-carrier frequency.

23. The apparatus of claim 15, wherein said means (C) for disabling said standard ranging operation in order to free each said standard ranging channel for said video-ranging operation if said estimated distance between said active satellite and said passive/target satellite is less than said predetermined distance further includes:

(C1) a receiver configured to receive a command signal from said TTC in a command channel, wherein said command signal is configured to indicate that a distance between said active satellite and said passive/target satellite is less than said predetermined distance; and (C2) at least two switches, each said switch configured to switch one said telemetry channel to said video-ranging operation.

24. The apparatus of claim 15, wherein said means (D) for performing said video-ranging operation further comprises:

(D1) a means for generating a plurality of images of said passive/target satellite.

25. The apparatus of claim 15, wherein said means (D) for performing said video-ranging operation further comprises:
- (D2) said active satellite equipped with at least two digital video cameras; wherein said at least two digital video cameras is configured to substantially continuously generate a plurality of compressed colored 3-D digital video signals; each said compressed colored 3-D digital video signal representing a compressed colored 3-D image of said passive/target satellite.

26. The apparatus of claim 15, wherein said means (D) for performing said video-ranging operation further comprises:
- (D3) said active satellite equipped with at least two digital black & white video cameras; wherein each digital black & white video camera is configured to consubstantially continuously generate a plurality of black & white 3-D digital video signals, each said black & white 3-D digital video signal representing a 3-D image of said passive/target satellite.

27. The apparatus of claim 22, wherein said means (E) for transmitting said plurality of images of said passive/target satellite obtained by said active satellite to said (TTC) by using said at least two standard ranging channels further includes:

- (E1) at least two spacecraft antennas, a Fore (Forward) spacecraft antenna, and a Aft (Back) spacecraft antenna, configured to transmit to said TTC said plurality of images of said passive/target satellite using said at least two standard ranging channels; and

- (E2) a combiner and a divider configured to combine and to divide in proper proportions signals generated by said first telemetry transmitter and said second telemetry transmitter in order to optimize the transmission of said images of said passive/target satellite without pointing each said spacecraft antenna.

\* \* \* \* \*